US012576396B2

(12) United States Patent
Zhu et al.

(10) Patent No.: US 12,576,396 B2
(45) Date of Patent: Mar. 17, 2026

(54) POLYNORBORNENE/CARBON BLACK-CROSS-LINKED THREE-DIMENSIONAL NETWORK-IMMOBILIZED COPPER/GOLD (PNBI/CB-Cu/Au) NANOCATALYST, AND PREPARATION METHOD AND USE THEREOF

(71) Applicant: HUBEI ENGINEERING UNIVERSITY, Xiaogan (CN)

(72) Inventors: Lei Zhu, Xiaogan (CN); Biao Han, Xiaogan (CN); Bojie Li, Xiaogan (CN); Yaoyao Zhang, Xiaogan (CN); Weishuang Li, Xiaogan (CN)

(73) Assignee: HUBEI ENGINEERING UNIVERSITY, Xiaogan (CN)

( * ) Notice: Subject to any disclaimer, the term of this patent is extended or adjusted under 35 U.S.C. 154(b) by 612 days.

(21) Appl. No.: 17/927,677

(22) PCT Filed: Jul. 26, 2022

(86) PCT No.: PCT/CN2022/107780
§ 371 (c)(1),
(2) Date: Nov. 23, 2022

(87) PCT Pub. No.: WO2023/206835
PCT Pub. Date: Nov. 2, 2023

(65) Prior Publication Data

US 2024/0261768 A1 Aug. 8, 2024

(30) Foreign Application Priority Data

Apr. 28, 2022 (CN) ......................... 202210471213.7

(51) Int. Cl.

| | |
|---|---|
| ***B01J 23/89*** | (2006.01) |
| ***B01J 31/06*** | (2006.01) |
| ***B01J 35/30*** | (2024.01) |
| ***B01J 37/00*** | (2006.01) |
| ***B01J 37/02*** | (2006.01) |
| ***B01J 37/03*** | (2006.01) |
| ***B01J 37/04*** | (2006.01) |
| ***B01J 37/06*** | (2006.01) |
| ***B01J 37/08*** | (2006.01) |
| ***C07F 5/02*** | (2006.01) |

(52) U.S. Cl.
CPC ......... *B01J 23/8926* (2013.01); *B01J 31/069* (2013.01); *B01J 35/393* (2024.01); *B01J 37/0018* (2013.01); *B01J 37/009* (2013.01); *B01J 37/0201* (2013.01); *B01J 37/0236* (2013.01); *B01J 37/031* (2013.01); *B01J 37/04* (2013.01); *B01J 37/06* (2013.01); *B01J 37/08* (2013.01); *C07F 5/027* (2013.01); *B01J 2231/32* (2013.01)

(58) Field of Classification Search
CPC .............................. B01J 23/8926; C07F 5/027
See application file for complete search history.

(56) References Cited

FOREIGN PATENT DOCUMENTS

CN 110327973 A * 10/2019

OTHER PUBLICATIONS

Kidonakis, et al. Org. Biomol. Chem., 2020, 18, 8921.*
Lei, et al. English machine translation of Cn 11032793A, Oct. 15, 2019; translation retrieved on May 31, 2025 from Espacenet.com.*
Boeva, et al. International Journal of Hydrogen Energy, 47, (2022), 4759-4765; available online Dec. 1, 2021.*

* cited by examiner

*Primary Examiner* — Shawquia Jackson
(74) *Attorney, Agent, or Firm* — Bochner PLLC; Andrew D. Bochner

(57) ABSTRACT

The present disclosure belongs to the technical field of catalyst preparation, and provides a polynorbornene/carbon black-cross-linked three-dimensional network-immobilized bimetallic copper/gold (PNBI/CB-Cu/Au) nanocatalyst, and a preparation method and use thereof. Metallic copper and gold both exist in a form of nanoparticles in the catalyst and are uniformly dispersed, and further enhancing a catalytic performance. Moreover, the carrier is a polynorbornene/carbon black-cross-linked three-dimensional network, and a relative content of free hydroxyl groups in the catalyst is controlled by changing a monomer ratio to adjust a hydrophilic-lipophilic balance value of the catalyst, adapting to a reaction of an organic phase with an aqueous phase. Furthermore, the catalyst is insoluble in conventional solvents, and has a desirable effect in immobilizing nanoscale metallic copper, prolonging a service life of the catalyst.

17 Claims, 4 Drawing Sheets

Broad Unknown Relative Peak Table

| | Distribution Name | Mn (Daltons) | Mw (Daltons) | MP (Daltons) | Mz (Daltons) | Mz+1 (Daltons) | Polydispersity | Mz/Mw | Mz+1/Mw |
|---|---|---|---|---|---|---|---|---|---|
| 1 | | 10441 | 12459 | 12440 | 14449 | 16498 | 1.193274 | 1.159680 | 1.324202 |

| | Name | | | | |
|---|---|---|---|---|---|
| | Injection | Retention time (min) | Peak area (μV*sec) | % Area | Amplitude (μV) |
| 1 | 1 | 12.652 | 3358688 | 96.66 | 167199 |
| 2 | 1 | 11.629 | 115953 | 3.34 | 6769 |

| | Name | | | | |
|---|---|---|---|---|---|
| | Injection | Retention time (min) | Peak area (μV*sec) | % Area | Amplitude (μV) |
| 1 | 1 | 12.687 | 2504282 | 50.29 | 125626 |
| 2 | 1 | 11.625 | 2475644 | 49.71 | 141537 |

POLYNORBORNENE/CARBON BLACK-CROSS-LINKED THREE-DIMENSIONAL NETWORK-IMMOBILIZED COPPER/GOLD (PNBI/CB-Cu/Au) NANOCATALYST, AND PREPARATION METHOD AND USE THEREOF

CROSS REFERENCE TO RELATED APPLICATION

The present application claims the priority to Chinese Patent Application No. CN202210471213.7, filed with China National Intellectual Property Administration (CNIPA) on Apr. 28, 2022 and titled "POLYNORBORNENE/CARBON BLACK-CROSS-LINKED THREE-DIMENSIONAL NETWORK-IMMOBILIZED COPPER/GOLD (PNBI/CB-Cu/Au) NANOCATALYST, AND PREPARATION METHOD AND USE THEREOF", which is incorporated herein by reference entirety.

TECHNICAL FIELD

The present disclosure relates to the technical field of catalyst preparation, in particular to a polynorbornene/carbon black-cross-linked three-dimensional network-immobilized bimetallic copper/gold (PNBI/CB-Cu/Au) nanocatalyst, and a preparation method and use thereof.

BACKGROUND ART

Chirality is a fundamental property of all natural substances, as well as the basic substances that constitute living organisms, such as polysaccharides, nucleic acids, and proteins all have chirality. The vast majority of drugs are composed of chiral molecules, and two chiral molecules may have significantly different biological activities. Compared with its racemate, a single optically-active chiral drug has a clear therapeutic target, higher efficacy, and safety, and lower adverse reactions. It has gradually become a research hotspot in the fields of medicinal chemistry and organic chemistry to efficiently and exclusively to obtain chiral drugs.

Organoboron compounds are a class of important intermediates widely existing in the structures of natural products and drug molecules. In addition, the organoboron compounds are also important synthons in organic synthesis, where C—B bonds can be further transformed into C—O, C—N, and C—C bonds. Compared with traditional methods using equivalent amount of reagents, a strategy of direct boron addition to unsaturated carbonyl compounds under the action of catalysts is more direct and effective, which has received extensive attention in recent years.

Chinese patent ZL201610271869.9 disclosed a method for preparing an organoboron compound catalyzed by chitosan-supported copper.

However, in the above patent, a catalyst metal copper is divalent, such as copper sulfate, copper chloride, and copper hydroxide, and copper is easy to fall off during the reaction, resulting in decreased catalyst activity and environmental pollution, which is not suitable for actual production. These factors greatly limited the use of such methods in practical production. In comparison, heterogeneous zero-valent copper is cheaper and more environmental-friendly. Therefore, the development of heterogeneous catalysts based on zero-valent copper is the current research focus and difficulty in this field, with important theoretical and use values.

On the other hand, for heterogeneous catalysts, the choice of carriers is crucial. In the above patent, the chitosan-immobilized copper catalyst adopts chitosan as a carrier, and the chitosan has a wider molecular weight distribution and is difficult to control in solubility. After a reaction is completed, crosslinked polymer-immobilized heterogeneous catalysts can be conveniently separated from other components in a reaction system by a solid-liquid separation method, and can be reused after simple regeneration. Therefore, such catalysts can greatly reduce a production cost and also significantly reduce various environmental pollutions.

Furthermore, the conversion of organoboron compounds to β-hydroxy compounds is an important class of uses in industrial production. Since β-hydroxyl structures are widely found in natural products and drug molecular structures, if a "one-pot" strategy can be adopted, the asymmetric boron addition of substrates can be achieved, followed by continuous conversion to the β-hydroxy compounds without separation. This may simplify synthetic steps of the natural products and have very important use values.

SUMMARY

In view of the above existing problems, the present disclosure provides a polynorbornene/carbon black-cross-linked three-dimensional network-immobilized bimetallic copper/gold (PNBI/CB-Cu/Au) nanocatalyst, and preparation method and use thereof. In the present disclosure, the catalyst can overcome a problem in the prior art that various copper salt-based homogeneous catalysts for asymmetric boron addition are not easy to be separated and recovered after reaction, which causes serious loss of metallic copper, resulting in a high cost of use and environmental pollution. Compared with the existing catalysts, the PNBI/CB-Cu/Au nanocatalyst has higher catalytic activity, greater yield, and desirable enantioselectivity, can be recycled many times due to longer service life, and is conducive to environmental protection.

To achieve the above objective, the present disclosure adopts the following technical solutions.

The present disclosure provides a PNBI/CB-Cu/Au nanocatalyst, including a polynorbornene/carbon black-cross-linked three-dimensional network carrier, and gold nanoparticles and copper nanoparticles that are immobilized on the carrier. The active ingredient of the catalyst is copper, and the gold nanoparticles and the copper nanoparticles have a molar ratio of 1:1, and each has a relative content of 0.20 mmol/g to 0.25 mmol/g in the PNBI/CB-Cu/Au nanocatalyst. The polynorbornene/carbon black-cross-linked three-dimensional network carrier is a three-dimensional network formed by conducting copolymerization on three different norbornene monomers to obtain polynorbornene and cross-linking the polynorbornene with carbon black; and the carbon black is a commercially-purchased activated carbon powder.

In the PNBI/CB-Cu/Au nanocatalyst, copper and gold are in the form of nanoparticles with desirable dispersibility; copper is as an active ingredient, and gold disperses the copper evenly and prevents the active copper from agglomerating after the reaction.

Further, the polynorbornene may be a product obtained after conducting polymerization on a norbornene monomer 1 (Formula 1), a norbornene monomer 2 (Formula 2), and a norbornene monomer 3 (Formula 3) with the molar ratio of 1:(0.75-1.25):(0.75-1.25);

1

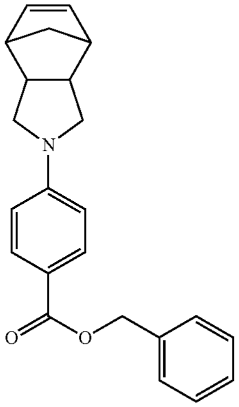

2

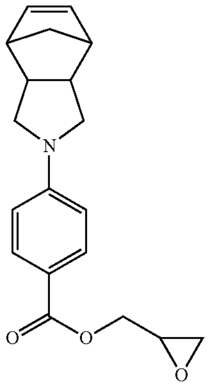

3

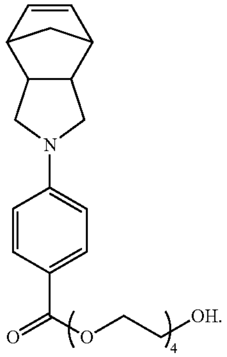

The present disclosure further provides a preparation method of the PNBI/CB-Cu/Au nanocatalyst, including the following steps:

1) conducting a reaction on a reaction mixture A including the norbornene monomer 1, the norbornene monomer 2, the norbornene monomer 3, and an initiator in an inert atmosphere at a room temperature for 1 h to 3 h, where the norbornene monomer 1, the norbornene monomer 2, the norbornene monomer 3, and the initiator have a molar ratio of 1:(0.75-1.25):(0.75-1.25):(0.01-0.05);
2) adding a quenching agent to the reaction mixture A, continuing to stir for 5 min to 20 min to obtain a reaction mixture B, and subjecting the reaction mixture B to concentration and precipitation to obtain polynorbornene;
3) dispersing the polynorbornene and a carbon black mixture in an organic solvent and stirring well, washing, filtering, and removing the organic solvent under vacuum to obtain a polynorbornene/carbon black mixture; where the mixture has 30% to 70% of the polynorbornene by a mass fraction;
4) dispersing the polynorbornene/carbon black mixture and sodium borohydride in a diethylene glycol dimethyl ether/dichloromethane mixed solvent, adding copper acetate and chloroauric acid at a molar ratio of 1:1, and stirring 2-6 h to obtain a reaction mixture C; where the sodium borohydride and the copper acetate have a molar ratio of (3-5):1;
5) adding diethyl ether to the reaction mixture C to separate out an crude product, washing and drying the crude product, and heating at 150-170° C. for 4-7 h under an inert gas to obtain the PNBI/CB-Cu/Au nanocatalyst.

Further, the initiator may be a Grubbs initiator; and the quenching agent may be ethyl vinyl ether.

Further, in the reaction mixture A, a solvent may be dichloromethane; and in step 3), the organic solvent may be dichloromethane.

The present disclosure further provides use of the PNBI/CB-Cu/Au nanocatalyst in catalyzing asymmetric boron addition of α,β-unsaturated ketone with bis(pinacolato) diboron.

Further, the use may include the following steps:

mixing the α,β-unsaturated ketone, the bis(pinacolato) diboron, a ligand and copper in the PNBI/CB-Cu/Au nanocatalyst at a molar ratio of 1:(1-1.2):0.003:(0.1%-0.3%); adding a mixed solution of methanol and toluene at a volume ratio of 4:(1-4) to the mixture, and stirring at a room temperature for 8-16 h to obtain an asymmetric boron addition product of the α,β-unsaturated ketone;

the ligand is

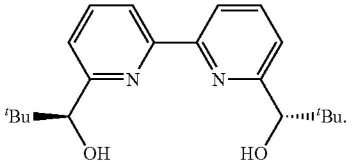 [SMILES: CC(C)(C)[C@H](O)c1cccc(-c2cccc([C@@H](O)C(C)(C)C)n2)n1]

Further, the α,β-unsaturated ketone may be selected from the group consisting of chalcone, (penta)-3-phenyl-1-(p-tolyl)prop-2-ene-1-one, (1-phenyl-3-(p-tolyl)prop-2-en-1-one, (1-phenyl-3-(p-methoxyphenyl)prop-2-en-1-one, (penta)-3-(4-chlorophenyl)-1-phenylprop-2-en-1-one, and (E)-1-phenyl-3-(thiophen-2-yl)prop-2-en-1-one.

Further, after the reaction is completed, a reaction product is filtered to recover the PNBI/CB-Cu/Au nanocatalyst, a filtrate is spin-dried to remove the solvent, and the product is separated by column chromatography.

Further, the PNBI/CB-Cu/Au nanocatalyst may be applied to asymmetric boron addition of the chalcone for the first time, with a product yield of 96% and enantioselectivity of 93%.

In the present disclosure, the PNBI/CB-Cu/Au nanocatalyst has a higher catalytic activity, an excellent product yield in catalyzing the asymmetric boron addition of the α,β-unsaturated ketone, and desirable enantioselectivity. Meanwhile, the PNBI/CB-Cu/Au nanocatalyst has desirable yield and enantioselectivity in an extremely low dosage (0.25 mol %). In addition, copper and gold in the PNBI/CB-Cu/Au nanocatalyst are in the form of nanoparticles with desirable dispersibility, which has a great effect on the improvement of catalytic activity. Furthermore, the PNBI/CB-Cu/Au nanocatalyst can be stored well without metal drop or structural damage.

BRIEF DESCRIPTION OF THE DRAWINGS

FIG. 4 shows a high-performance liquid chromatography (HPLC) chart of an asymmetric boron addition product of chalcone in Use Example 1, where

DETAILED DESCRIPTION OF THE EMBODIMENTS

Figure 1:
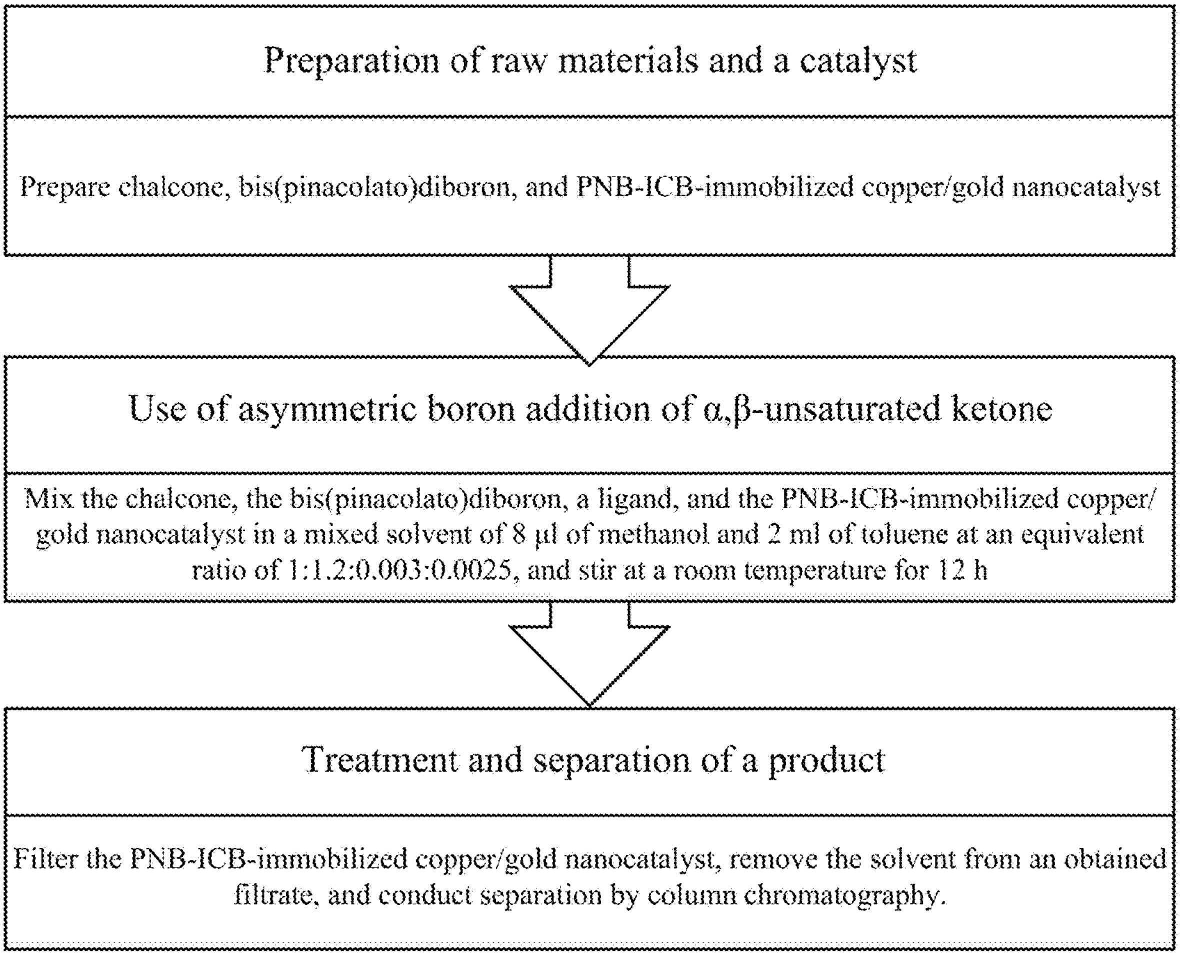
FIG. 1 shows a schematic flow diagram of a PNBI/CB-Cu/Au nanocatalyst provided by the present disclosure in asymmetric boron addition between α,β-unsaturated ketone and bis(pinacolato) diboron.

The present disclosure is further described below with reference to the accompanying drawings and specific examples, but the present disclosure is not limited thereto.

In the following examples, three monomers are as follows: norbornene monomer 1, norbornene monomer 2, and norbornene monomer 3, with structural formulas as follows, respectively:

1

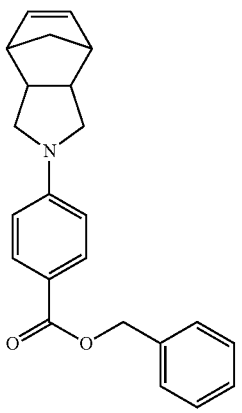

2

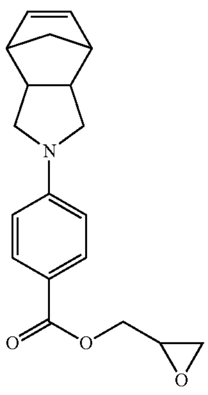

-continued

3

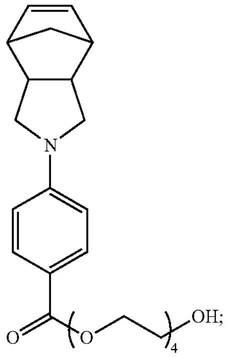

EXAMPLE

In this example, a PNBI/CB-Cu/Au nanocatalyst included two metals, copper and gold, where an active ingredient was copper, gold made the copper dispersed evenly and did not aggregate after the reaction, copper and gold were nanostructured, and a carrier was a polynorbornene/carbon black-cross-linked three-dimensional network. Meanwhile, in the PNBI/CB-Cu/Au nanocatalyst, the gold and the active ingredient copper each had a relative content of 0.20-0.25 mmol/g, such as 0.20 mmol/g, 0.21 mmol/g, 0.23 mmol/g, and 0.25 mmol/g mmol/g.

The polynorbornene/carbon black-cross-linked three-dimensional network carrier was a three-dimensional network formed by conducting copolymerization on three different norbornene monomers to obtain polynorbornene and cross-linking the polynorbornene with carbon black.

In this example, a preparation method of the PNBI/CB-Cu/Au nanocatalyst was provided, including the following steps:

1) Preparation of polynorbornene: according to a molar ratio of three monomers at 1:1:1, 345.44 mg of a norbornene monomer 1, 311.38 mg of a norbornene monomer 2, 431.53 mg of a norbornene monomer 3, and 20 mg of an initiator Grubbs-I were dissolved in 50 mL of dichloromethane, and stirred at a room temperature for 2 h under an argon atmosphere. A mixture was quenched with 5 ml of ethyl vinyl ether for 10 min, and concentrated by rotary evaporation. The product was slowly poured into diethyl ether to obtain a precipitate, filtered, washed with diethyl ether, and dried to obtain the polynorbornene.

2) Preparation of a polynorbornene carbon black network-immobilize copper/gold nanocatalyst: 500 mg of the polynorbornene obtained in step 1) and 500 mg of an activated carbon powder were added to 50 mL of a dichloromethane solvent, mixed by stirring, washed several times, and filtered; the residual solvent was removed under vacuum to obtain a desired polynorbornene carbon black network (PNBICB). 1 g of the PNBICB was dispersed uniformly in 50 ml of an anhydrous diethylene glycol dimethyl ether/dichloromethane mixed solvent, and 53 mg of sodium borohydride was added and dissolved to obtain a mixed system; 51.0 mg of an anhydrous diethylene glycol dimethyl ether solution containing copper acetate and chloroauric acid (the copper acetate and the chloroauric acid had a molar ratio of 1:1) was added dropwise to the mixed system, and stirred at a room temperature for 2 h. Excess diethyl ether was added dropwise to the system, followed by filtration, repeated diethyl ether washing, and removal of residual solvent to obtain a black solid.

3) Preparation of a PNBI/CB-Cu/Au nanocatalyst: the black solid in step 2) was heated at 170° C. for 5 h under an argon atmosphere to obtain the PNBI/CB-Cu/Au nanocatalyst.

Figure 2:
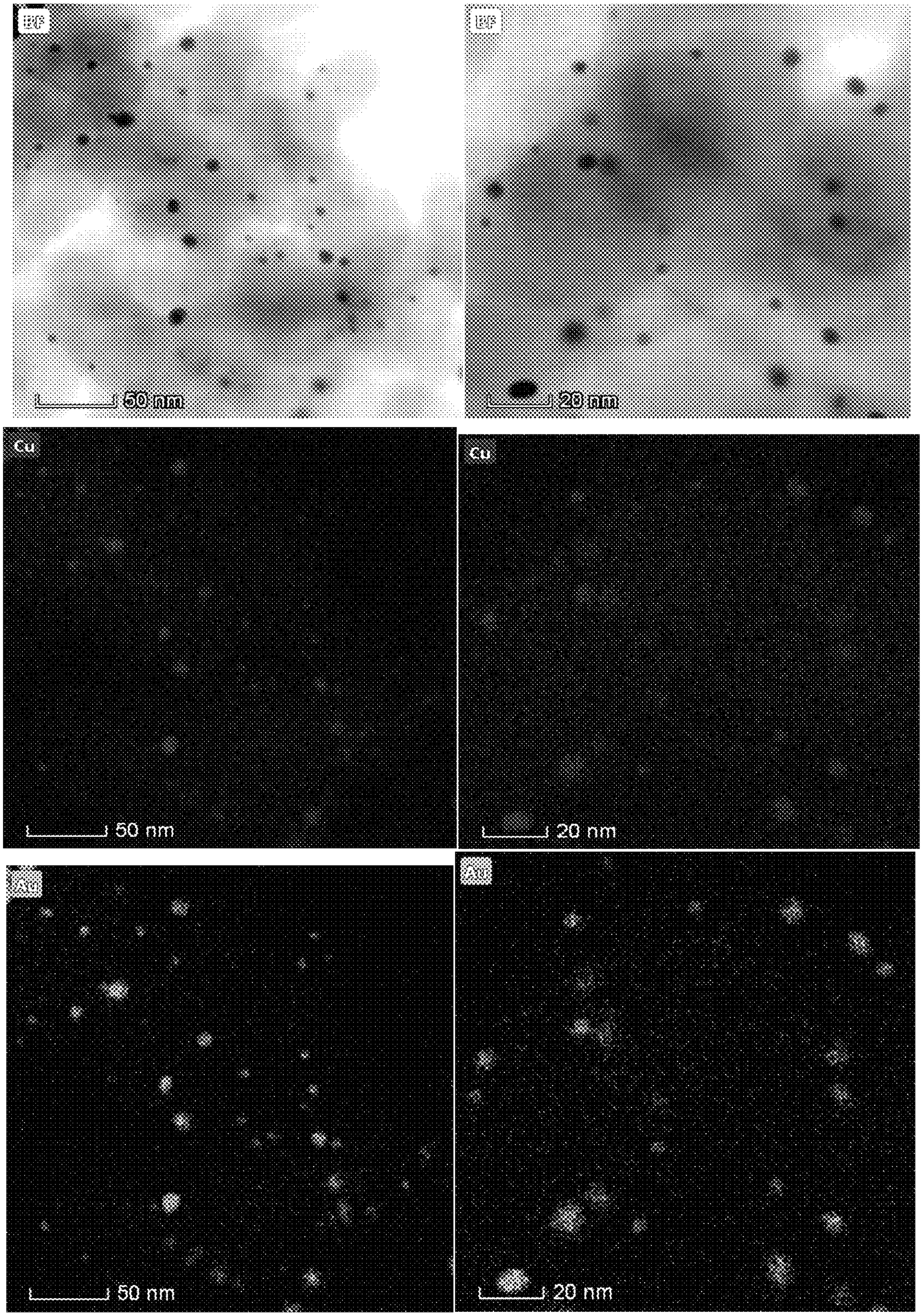
FIG. 2 shows a transmission electron microscope (TEM) image of a PNBI/CB-Cu/Au nanocatalyst obtained in Example 1.

During the preparation of the PNBI/CB-Cu/Au nanocatalyst, copper ions were reduced to zero-valent copper by the sodium borohydride. Through TEM (FIG. 2) observation and analysis, it was found that copper and gold nanoparticles each were highly uniformly-dispersed in the polymer, with an average particle size of 5 nm±3 nm and uniform distribution in the PNBI/CB-Cu/Au nanocatalyst. It was seen that in the PNBI/CB-Cu/Au nanocatalyst, copper had a smaller average particle size, such that copper had a larger surface area in contact with the reactants, thereby enhancing a catalytic activity of the PNBI/CB-Cu/Au nanocatalyst to improve a product yield and accelerate the reaction.

Figure 3:
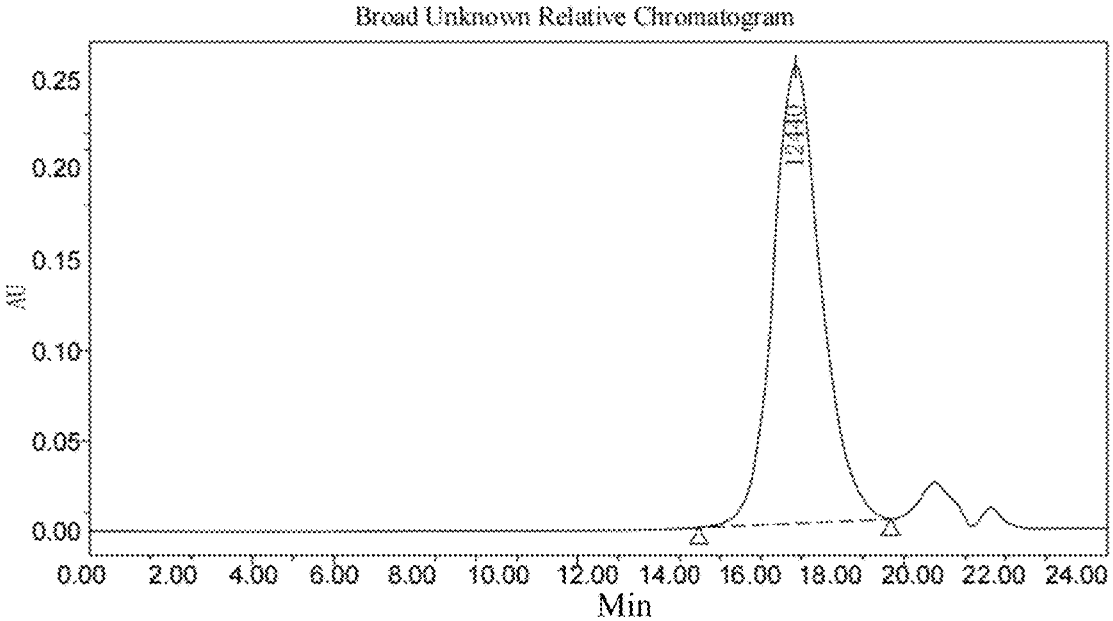
FIG. 3 shows a gel permeation chromatography flow curve of polynorbornene obtained in Example 1.

FIG. 3 showed a gel permeation chromatography flow curve of the polynorbornene sample prepared in step 1). The polynorbornene had a desirable spectrum. According to an average molecular weight table of the polynorbornene in the figure, it was known that the polynorbornene had a number average molecular weight Mp of 12,440.

By changing an amount of the Grubbs-I, a degree of polymerization and a molecular weight of the polymer were adjusted; a relative content of copper and gold in the PNBICB-immobilize copper/gold nanocatalyst was adjusted by changing a volume or concentration of the copper acetate/chloroauric acid solution; a size of copper nanoparticles in the PNBICB-immobilize copper/gold nanocatalyst was adjusted by changing an amount of the sodium borohydride.

In addition, in the example, use of the PNBI/CB-Cu/Au nanocatalyst was provided in asymmetric boron addition between α,β-unsaturated ketone and bis(pinacolato)diboron; FIG. 1 showed a schematic flow diagram of the PNBI/CB-Cu/Au nanocatalyst provided by the present disclosure in the asymmetric boron addition between the α,β-unsaturated ketone and bis(pinacolato)diboron; as shown in FIG. 1, the use included:

the α,β-unsaturated ketone, the bis(pinacolato)diboron, a ligand, and the PNBI/CB-Cu/Au nanocatalyst prepared in Example 1 were added to a mixed solvent of 8 μl of methanol and 2 ml of toluene at a molar ratio of 1:1.2:0.003:0.0025, and stirred at a room temperature for 12 h; the PNBI/CB-Cu/Au nanocatalyst was filtered, spin-dried to remove solvents, and separated by column chromatography to obtain the product of asymmetric boron addition between the α,β-unsaturated ketone and the bis(pinacolato)diboron. Meanwhile, the PNBI/CB-Cu/Au nanocatalyst was used for the first time in the asymmetric boron addition between the α,β-unsaturated ketone and the bis(pinacolato)diboron, with a product yield of 90%-97%. The asymmetric boron addition was as follows:

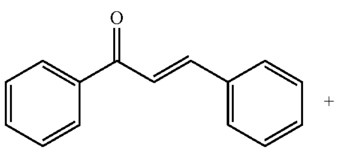

-continued

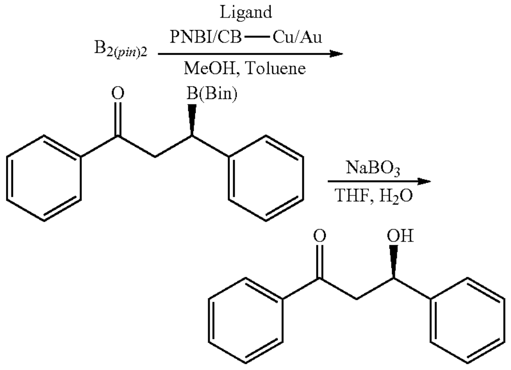

The α,β-unsaturated ketone was chalcone, and the ligand was

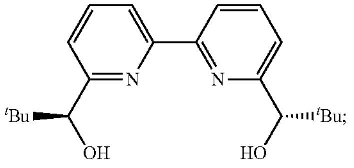 [SMILES: CC(C)(C)[C@H](O)c1cccc(-c2cccc([C@@H](O)C(C)(C)C)n2)n1]

after reaction, the PNBI/CB-Cu/Au nanocatalyst was filtered, washed with water and ethanol for several times, and dried for repeated use.

Use Example 1

The PNBI/CB-Cu/Au nanocatalyst provided by the above example was applied to asymmetric boron addition of chalcone and bis(pinacolato) diboron; where the chalcone was 0.20 mmol, the bis(pinacolato) diboron was 0.24 mmol, the ligand was 0.0006 mmol, the PNBI/CB-Cu/Au nanocatalyst was 0.0005 mmol, the methanol was 8 μl, and the toluene was 2 ml; a reaction was conducted at a room temperature for 12 h, the catalyst was filtered out, a filtrate was rotary-evaporated to remove the solvent, and separated by column chromatography to obtain an asymmetric boron addition product with a yield of 96% and ee of 93%. The ee represented that a percentage of a target product (the asymmetric boron addition product) decreased by a percentage of a by-product (another isomer), which was used to reflect the enantioselectivity.

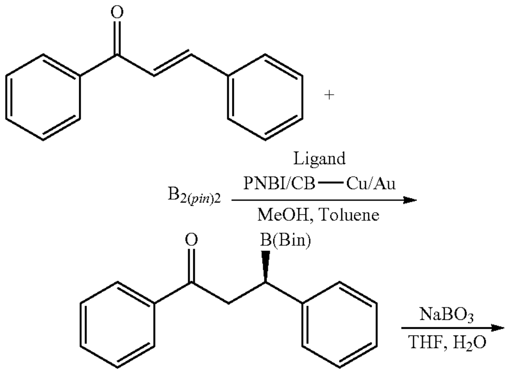

-continued

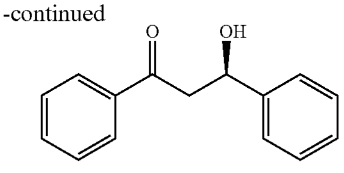

The $^1H$ NMR and $^{13}C$ NMR of the target product were shown below:

$^1H$ NMR (400 MHZ) δ 7.96 (d, J=7.0 Hz, 2H), 7.63-7.54 (m, $^1H$), 7.52-7.42 (m, 4H), 7.39 (t, J=7.0 Hz, 2H), 7.35-7.28 (m, $^1H$), 5.37-5.34 (m, $^1H$), 3.62 (d, J=2.8 Hz, $^1H$), 3.38 (d, J=6.0 Hz, 2H).

$^{13}C$ NMR (100 MHZ) δ 200.20, 142.85, 136.47, 133.66, 128.69, 128.56, 128.13, 127.67, 125.72, 69.99, 47.36.

Figure 5:
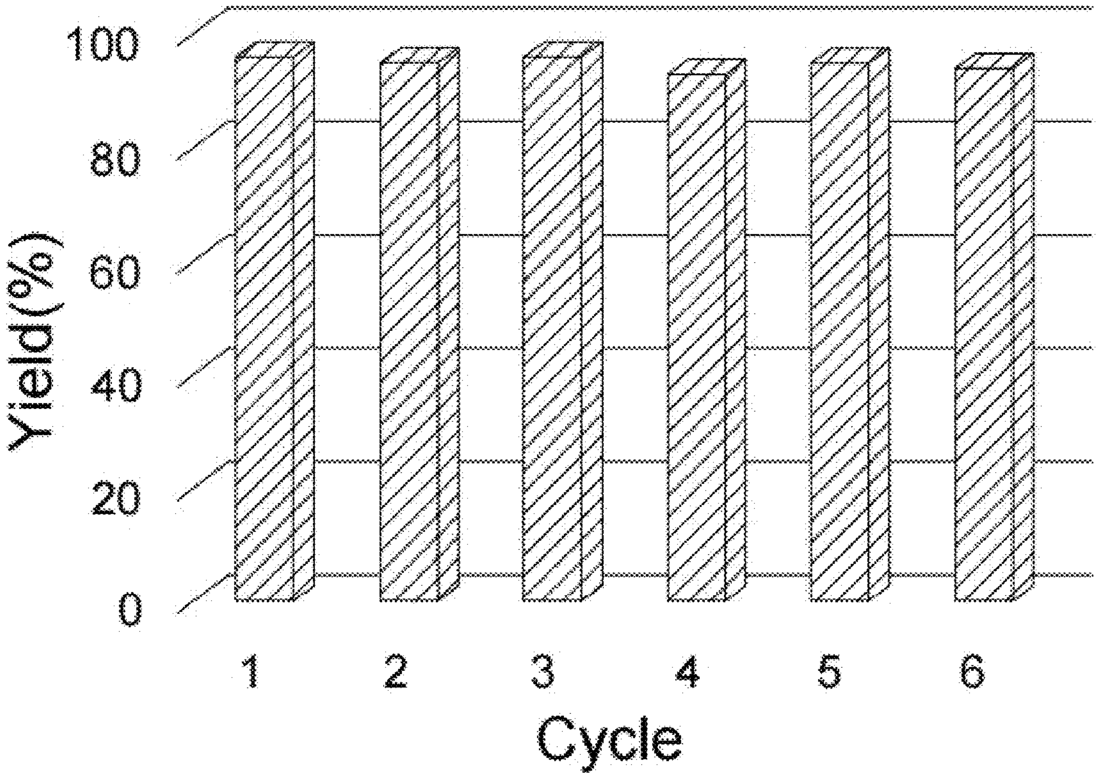
FIG. 5 shows experimental results of reuse of the PNBI/CB-Cu/Au nanocatalyst in Use Example 1.

After fully reaction, the PNBI/CB-Cu/Au nanocatalyst separated by filtration, washed thrice with water and ethanol, and dried at 40°C for recovery. Under the same conditions, the recovered PNBI/CB-Cu/Au nanocatalyst was applied to the asymmetric boron addition of chalcone, and the above process was reused for 6 times to obtain reaction yields of 96%, 95%, 96%, 93%, 95%, and 94% (FIG. 5).

Figure 4A:
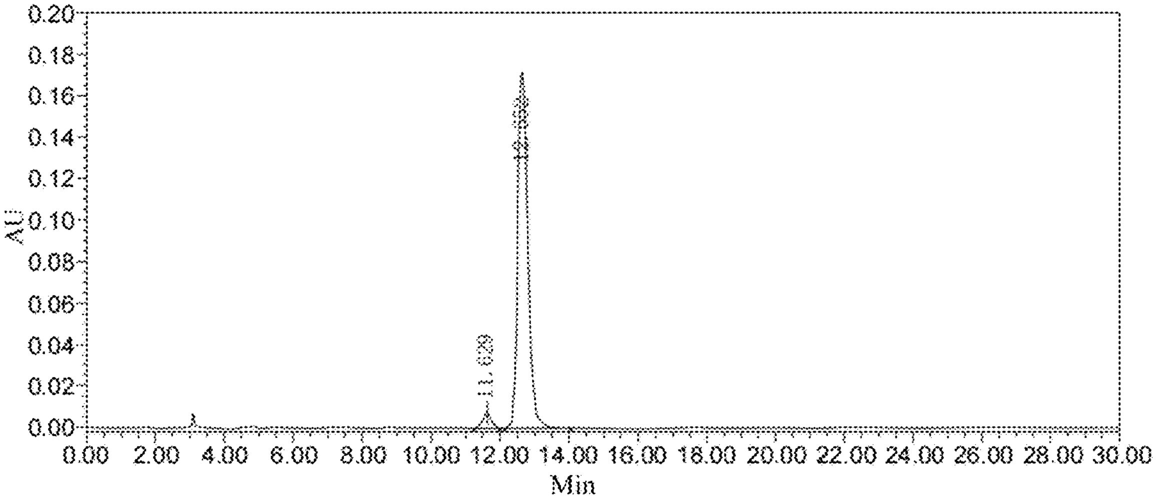
FIG. 4A is the HPLC of a racemate.
Figure 4B:
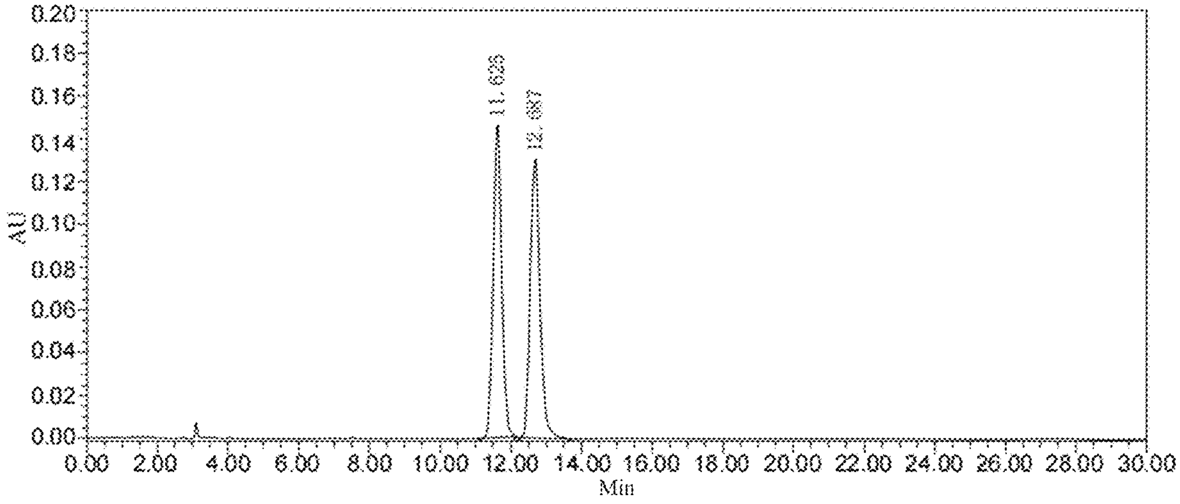
FIG. 4B is the HPLC of a chiral product.

Use Example 1 showed that under catalysis of the PNBI/CB-Cu/Au nanocatalyst, the chalcone had a high conversion rate and desirable enantioselectivity, and an asymmetric boron addition product had a yield reaching 96% and an ee of 93% (FIG. 4 showed a HPLC chart, where FIG. 4A was the HPLC of a racemate, and FIG. 4B was the HPLC of a chiral product).

Use Example 2

The PNBI/CB-Cu/Au nanocatalyst provided by the above example was applied to asymmetric boron addition of (penta)-3-phenyl-1-(p-tolyl)prop-2-ene-1-one and bis(pinacolato)diboron; where the (penta)-3-phenyl-1-(p-tolyl)prop-2-ene-1-one was 0.20 mmol, the bis(pinacolato)diboron was 0.24 mmol, the ligand was 0.0006 mmol, the catalyst was 0.0005 mmol, the methanol was 8 μl, and the toluene was 2 ml; a reaction was conducted at a room temperature for 12 h, the catalyst was filtered out, a filtrate was rotary-evaporated to remove the solvent, and separated by column chromatography to obtain an asymmetric boron addition product with a yield of 97% and an ee of 95%.

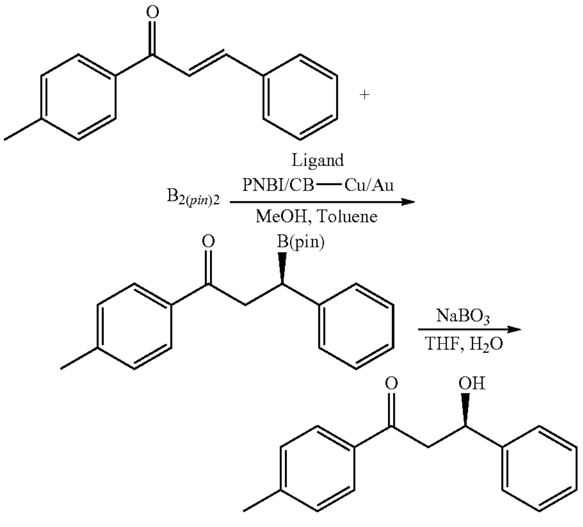

The $^1H$ NMR and $^{13}C$ NMR of the target product were shown below:

$^1H$ NMR (400 MHZ) δ 7.84 (d, J=8.2 Hz, 2H), 7.42 (d, J=7.2 Hz, 2H), 7.37 (t, J=7.4 Hz, 2H), 7.30 (d, J=7.2 Hz, $^1H$), 7.26-7.23 (m, 2H), 5.33-5.30 (m, $^1H$), 3.71 (br, $^1H$), 3.36-3.27 (m, 2H), 2.39 (s, 3H).

$^{13}C$ NMR (100 MHZ) § 199.8, 144.6, 142.9, 134.0, 129.3, 128.5, 128.2, 127.6, 125.7, 70.0, 47.2, 21.7.

Use Example 2 showed that under catalysis of the PNBI/CB-Cu/Au nanocatalyst, the (penta)-3-phenyl-1-(p-tolyl)prop-2-ene-1-one also had a high conversion rate, and an asymmetric boron addition product thereof had a yield reaching 97% and an ee of 95%.

Use Example 3

The PNBI/CB-Cu/Au nanocatalyst provided by the above example was applied to asymmetric boron addition of (1-phenyl-3-(p-tolyl)prop-2-en-1-one and bis(pinacolato)diboron; where the (1-phenyl-3-(p-tolyl)prop-2-en-1-one was 0.20 mmol, the bis(pinacolato)diboron was 0.24 mmol, the ligand was 0.0006 mmol, the catalyst was 0.0005 mmol, the methanol was 8 μl, and the toluene was 2 ml; a reaction was conducted at a room temperature for 12 h, the catalyst was filtered out, a filtrate was rotary-evaporated to remove the solvent, and separated by column chromatography to obtain an asymmetric boron addition product with a yield of 91% and an ee of 93%.

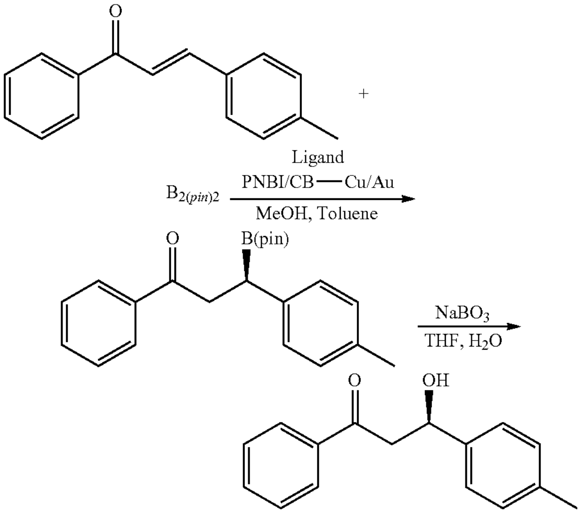

The $^1H$ NMR and $^{13}C$ NMR of the target product were shown below:

$^1H$ NMR (400 MHZ) δ 7.99-7.92 (m, 2H), 7.62-7.56 (m, $^1H$), 7.47-7.44 (m, 2H), 7.34 (d, J=8.0 Hz, 2H), 7.20 (d, J=7.8 Hz, 2H), 5.38-5.25 (m, $^1H$), 3.60 (d, J=2.8 Hz, $^1H$), 3.45-3.30 (m, 2H), 2.37 (s, 3H).

$^{13}C$ NMR (100 MHZ) δ 200.12, 139.99, 137.27, 136.56, 133.53, 129.16, 128.62, 128.10, 125.65, 69.83, 47.35, 21.08.

Use Example 3 showed that under catalysis of the PNBI/CB-Cu/Au nanocatalyst, the (1-phenyl-3-(p-tolyl)prop-2-en-1-one also had a high conversion rate, and an asymmetric boron addition product had a yield reaching 97% and an ee of 93%.

Use Example 4

The PNBI/CB-Cu/Au nanocatalyst provided by the above example was applied to asymmetric boron addition of (1-phenyl-3-(p-methoxyphenyl)prop-2-en-1-one and bis(pinacolato)diboron; where the (1-phenyl-3-(p-methoxyphenyl)prop-2-en-1-one was 0.20 mmol, the bis(pinacolato) diboron was 0.24 mmol, the ligand was 0.0006 mmol, the catalyst was 0.0005 mmol, the methanol was 8 μl, and the toluene was 2 ml. The reaction was conducted at a room temperature for 12 h, the catalyst was filtered out, a filtrate was rotary-evaporated to remove the solvent, and separated by column chromatography to obtain an asymmetric boron addition product with a yield of 94% and an ee of 92%.

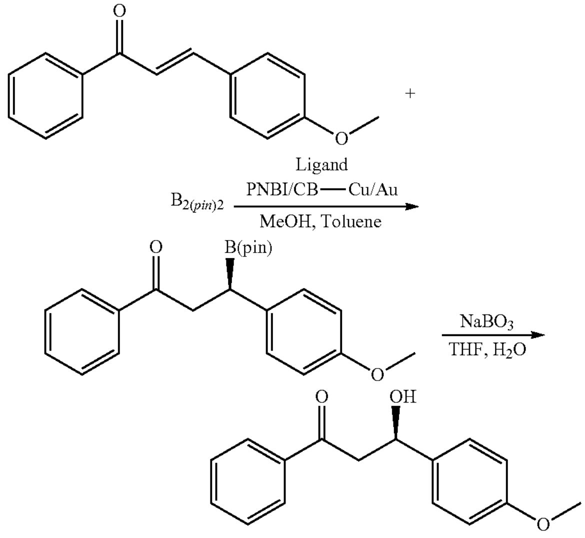

The $^{1}$H NMR and $^{13}$C NMR of the target product were shown below:

$^{1}$H NMR (400 MHZ) δ 7.96 (d, J=7.2 Hz, 2H), 7.60 (t, J=7.4 Hz, $^{1}$H), 7.48 (t, J=7.6 Hz, 2H), 7.37 (d, J=8.4 Hz, 2H), 6.92 (d, J=8.6 Hz, 2H), 5.31 (t, J=5.8 Hz, $^{1}$H), 3.81 (s, 3H), 3.57 (s, $^{1}$H), 3.37-3.35 (m, 2H).

$^{13}$C NMR (100 MHZ) δ 200.2, 159.0, 136.5, 135.0, 133.5, 128.6, 128.1, 126.9, 113.8, 69.6, 55.2, 47.2.

Use Example 4 showed that under catalysis of the PNBI/CB-Cu/Au nanocatalyst, the (1-phenyl-3-(p-methoxyphenyl)prop-2-en-1-one also had a high conversion rate, and an asymmetric boron addition product had a yield reaching 94% and an ee of 92%.

Use Example 5

The PNBI/CB-Cu/Au nanocatalyst provided by the above example was applied to asymmetric boron addition of (penta)-3-(4-chlorophenyl)-1-phenylprop-2-en-1-one and bis(pinacolato) diboron; where the (penta)-3-(4-chlorophenyl)-1-phenylprop-2-en-1-one was 0.20 mmol, the bis(pinacolato) diboron was 0.24 mmol, the ligand was 0.0006 mmol, the catalyst was 0.0005 mmol, the methanol was 8 μl, and the toluene was 2 ml; a reaction was conducted at a room temperature for 12 h, the catalyst was filtered out, a filtrate was rotary-evaporated to remove the solvent, and separated by column chromatography to obtain an asymmetric boron addition product with a yield of 93% and an ee of 92%.

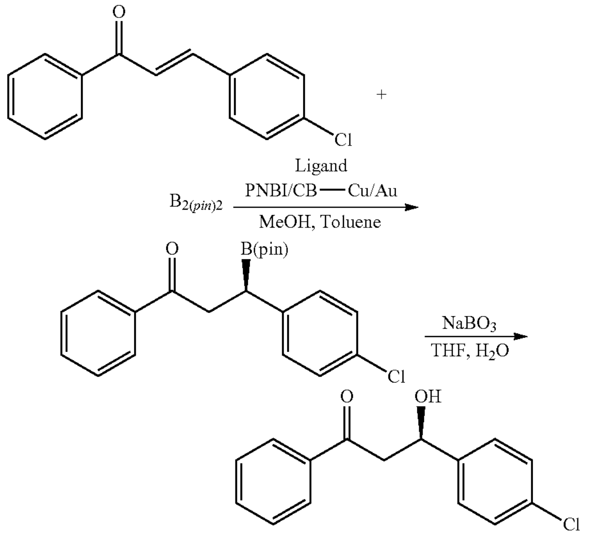

The $^{1}$H NMR and $^{13}$C NMR of the target product were shown below:

$^{1}$H NMR (400 MHZ) δ 7.95 (d, J=7.0 Hz, 2H), 7.62 (t, J=7.4 Hz, $^{1}$H), 7.49-7.46 (m, 2H), 7.39-7.33 (m, 4H), 5.34 (dd, J=7.0, 5.0 Hz, $^{1}$H), 3.66 (br, $^{1}$H), 3.35-3.28 (m, 2H).

$^{13}$C NMR (100 MHZ) δ 200.0, 141.4, 136.3, 133.8, 133.3, 128.7, 128.7, 128.1, 124.1, 69.4, 47.2.

Use Example 5 showed that under catalysis of the PNBI/CB-Cu/Au nanocatalyst, the (penta)-3-(4-chlorophenyl)-1-phenylprop-2-en-1-one also had a high conversion rate, and an asymmetric boron addition product had a yield reaching 93% and an ee of 92%.

Use Example 6

The PNBI/CB-Cu/Au nanocatalyst provided by the above example was applied to asymmetric boron addition of (E)-1-phenyl-3-(thiophen-2-yl)prop-2-en-1-one and bis(pinacolato)diboron; where the (E)-1-phenyl-3-(thiophen-2-yl) prop-2-en-1-one was 0.20 mmol, the bis(pinacolato)diboron was 0.24 mmol, the ligand was 0.0006 mmol, the catalyst was 0.0005 mmol, the methanol was 8 μl, and the toluene was 2 ml; a reaction was conducted at a room temperature for 12 h, the catalyst was filtered out, a filtrate was rotary-evaporated to remove the solvent, and separated by column chromatography to obtain an asymmetric boron addition product with a yield of 90% and an ee of 90%.

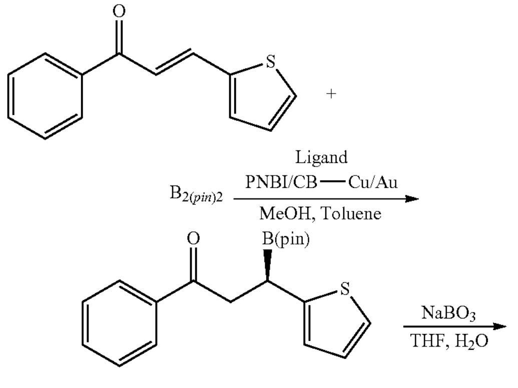

-continued

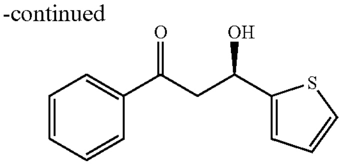

The H NMR and C NMR of the target product were shown below:

$^{1}$H NMR (400 MHZ) δ 7.99 (d, J=7.2 Hz, 2H), 7.63 (t, J=7.4 Hz, $^{1}$H), 7.51 (t, J=7.4 Hz, 2H), 7.29-7.27 (m, $^{1}$H), 7.05-6.98 (m, 2H), 5.63 (t, J=5.8 Hz, $^{1}$H), 3.76 (br, $^{1}$H), 3.53-3.51 (m, 2H).

$^{13}$C NMR (100 MHZ) δ 199.4, 146.6, 136.3, 133.6, 128.6, 128.0, 126.6, 124.5, 123.4, 66.3, 47.1.

Use Example 6 showed that under catalysis of the PNBI/CB-Cu/Au nanocatalyst, the (E)-1-phenyl-3-(thiophen-2-yl) prop-2-en-1-one also had a high conversion rate, and an asymmetric boron addition product thereof had a yield reaching 90% and an ee of 90%.

It can be seen that the PNBI/CB-Cu/Au nanocatalyst is applied to the asymmetric boron addition of chalcone and bis(pinacolato)diboron, which not only can obtain a higher product yield and better enantioselectivity, but also has more repeated use times with longer service life. Before complete deactivation, the PNBI/CB-Cu/Au nanocatalyst is more cost-effective for the asymmetric boron addition of chalcone and bis(pinacolato)diboron, which is more suitable for industrial uses.

Therefore, the PNBI/CB-Cu/Au nanocatalyst has a higher catalytic activity, greater product yield, and desirable enantioselectivity in catalyzing the asymmetric boron addition of α,β-unsaturated ketones. Meanwhile, the PNBI/CB-Cu/Au nanocatalyst can be recycled many times, and has an extremely low dosage in the asymmetric boron addition of chalcone and bis(pinacolato)diboron (0.25 mol %). In addition, copper and gold both exist in a form of nanoparticles in the PNBI/CB-Cu/Au nanocatalyst with uniform dispersion, enhancing a catalytic performance and preventing copper from aggregation after the reaction.

It should be understood that those skilled in the art can implement the modifications in combination with the prior art and the foregoing examples, and details are not described herein. Such modifications do not affect the essential content of the present disclosure, and will not be repeated.

The specific examples of the present disclosure are described above. It should be understood that the present disclosure is not limited to the above-mentioned specific examples, and devices and structures that are not described in detail should be understood to be commonly implemented in the art; any person skilled in the art can make many possible variations and modifications to the technical solutions of the present disclosure, or modify them to be equivalent examples of the variations, without departing from the spirit and technical solutions of the present disclosure. These do not affect the essential content of the present disclosure. Therefore, any simple modifications, equivalent substitutions, equivalent changes, and modifications made to the above examples according to the technical essence of the present disclosure without departing from the contents of the technical solutions of the present disclosure still fall in the protection scope of the technical solutions of the present disclosure.

What is claimed is:

1. A polynorbornene/carbon black-cross-linked three-dimensional network-immobilized bimetallic copper/gold (PNBI/CB-Cu/Au) nanocatalyst, comprising a polynorbornene/carbon black-cross-linked three-dimensional network carrier, and gold nanoparticles and copper nanoparticles that are immobilized on the polynorbornene/carbon black-cross-linked three-dimensional network carrier; wherein the gold nanoparticles and the copper nanoparticles have a molar ratio of 1:1;

the gold nanoparticles and the copper nanoparticles in the PNBI/CB-Cu/Au nanocatalyst each have a relative content of 0.20 mmol/g to 0.25 mmol/g;

an active ingredient of the PNBI/CB-Cu/Au nanocatalyst is the copper nanoparticles; the gold nanoparticles disperse the copper nanoparticles evenly and prevents the copper nanoparticles from agglomerating; and the polynorbornene/carbon black-cross-linked three-dimensional network carrier is a three-dimensional network formed by conducting copolymerization on three different norbornene monomers to obtain polynorbornene and cross-linking the polynorbornene with carbon black;

wherein the three different norbornene monomers have structures shown in Formula 1 to Formula 3, respectively:

Formula 1

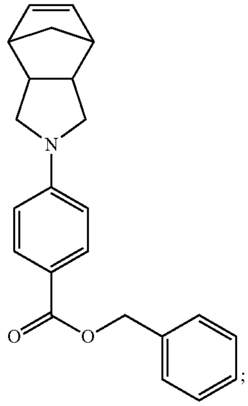

;

Formula 2

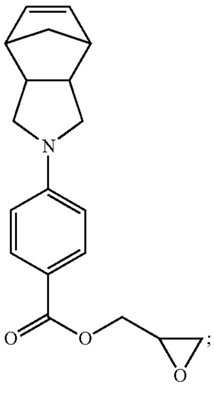

; and

-continued

Formula 3

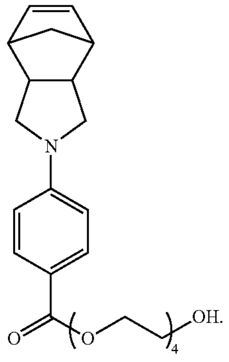

2. The PNBI/CB-Cu/Au nanocatalyst according to claim 1, wherein the copper nanoparticles and the gold nanoparticles immobilized on the polynorbornene/carbon black-crosslinked three-dimensional network carrier have an average particle size of 5 nm±3 nm.

3. The PNBI/CB-Cu/Au nanocatalyst according to claim 1, wherein the polynorbornene is a product obtained after conducting polymerization on a norbornene monomer 1 with a structure represented by Formula 1

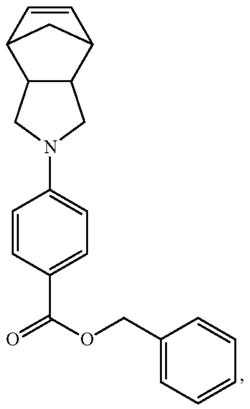

a norbornene monomer 2 with a structure represented by

Formula 2

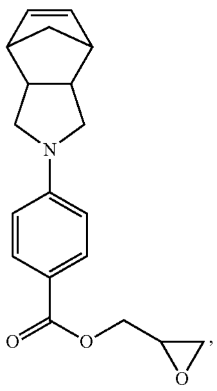

and a norbornene monomer 3 with a structure represented by

Formula 3

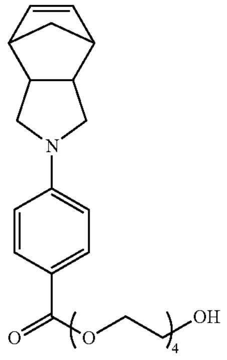

at a molar ratio of 1:(0.75-1.25):(0.75-1.25).

4. A preparation method of the PNBI/CB-Cu/Au nanocatalyst according to claim 1, comprising the following steps:

1) conducting a reaction on a reaction mixture A comprising the norbornene monomer 1 with the structure represented by Formula 1

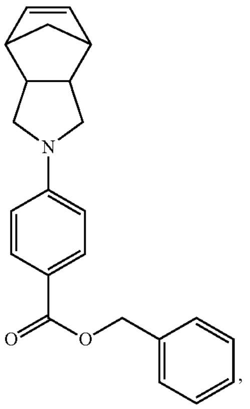

the norbornene monomer 2 with the structure represented by

Formula 2

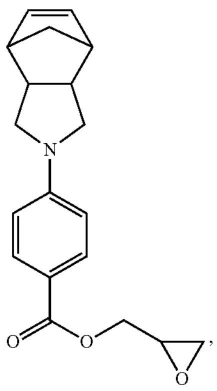

the norbornene monomer 3 with the structure represented by

Formula 3

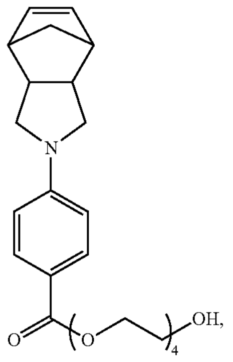

and an initiator in an inert atmosphere at a room temperature for 1 h to 3 h, wherein the norbornene monomer 1 with the structure represented by Formula 1

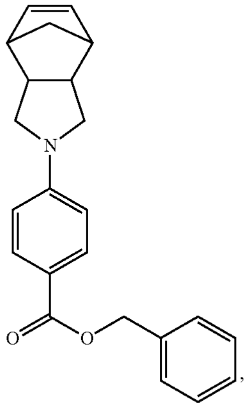

the norbornene monomer 2 with the structure represented by

Formula 2

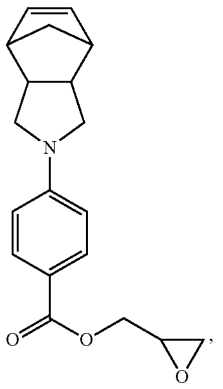

the norbornene monomer 3 with the structure represented by

Formula 3

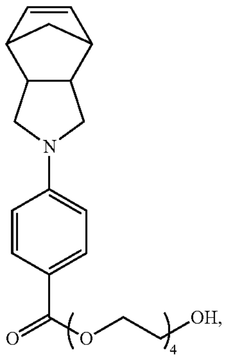

and the initiator have a molar ratio of 1:(0.75-1.25):(0.75-1.25): (0.01-0.05);

2) adding a quenching agent, continuing to stir for 5 min to 20 min to obtain a reaction mixture B, and subjecting the reaction mixture B to concentration and precipitation to obtain polynorbornene;

3) dispersing the polynorbornene and a carbon black mixture in an organic solvent and stirring well, washing, filtering, and removing the organic solvent under vacuum to obtain a polynorbornene/carbon black mixture; wherein the polynorbornene/carbon black mixture has 30% to 70% of the polynorbornene by mass fraction;

4) dispersing the polynorbornene/carbon black mixture and sodium borohydride in a diethylene glycol dimethyl ether/dichloromethane mixed solvent, adding copper acetate and chloroauric acid at a molar ratio of 1:1, and stirring 2 h to 6 h to obtain a reaction mixture C;

wherein the sodium borohydride and the copper acetate have a molar ratio of (3-5):1; and 5) adding diethyl ether to the reaction mixture C to separate out an initial product, washing and drying the initial product, and heating at 150° C. to 170° C. for 4 h to 7 h under an inert gas to obtain the PNBI/CB-Cu/Au nanocatalyst.

5. The preparation method according to claim 4, wherein the copper nanoparticles and the gold nanoparticles immobilized on the polynorbornene/carbon black-crosslinked three-dimensional network carrier have an average particle size of 5 nm±3 nm.

6. The preparation method according to claim 4, wherein the polynorbornene is a product obtained after conducting polymerization on a norbornene monomer 1 with a structure represented by Formula 1, a norbornene monomer 2 with a structure represented by Formula 2, and a norbornene monomer 3 with a structure represented by Formula 3 at a molar ratio of 1:(0.75-1.25):(0.75-1.25).

7. The preparation method according to claim 4, wherein the initiator is a Grubbs initiator; and the quenching agent is ethyl vinyl ether.

8. The preparation method according to claim 5, wherein the initiator is a Grubbs initiator; and the quenching agent is ethyl vinyl ether.

9. The preparation method according to claim 6, wherein the initiator is a Grubbs initiator; and the quenching agent is ethyl vinyl ether.

10. The preparation method according to claim 4, wherein in the reaction mixture A, a solvent is dichloromethane; and in step 3), the organic solvent is dichloromethane.

11. The preparation method according to claim 5, wherein in the reaction mixture A, a solvent is dichloromethane;
in step 3), the organic solvent is dichloromethane.

12. A catalyzing method of asymmetric boron addition of α,β-unsaturated ketone using the PNBI/CB-Cu/Au nanocatalyst according to claim 1; wherein
the use is conducted in the presence of a ligand; and
the ligand is

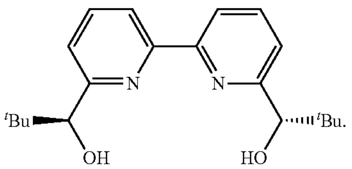 [SMILES: CC(C)(C)[C@H](O)c1cccc(-c2cccc([C@@H](O)C(C)(C)C)n2)n1]

13. The method according to claim 12, wherein the α,β-unsaturated ketone is selected from the group consisting of chalcone, (penta)-3-phenyl-1-(p-tolyl) prop-2-ene-1-one, (1-phenyl-3-(p-tolyl) prop-2-en-1-one, (1-phenyl-3-(p-methoxyphenyl) prop-2-en-1-one, (penta)-3-(4-chlorophenyl)-1-phenylprop-2-en-1-one, and (E)-1-phenyl-3-(thiophen-2-yl) prop-2-en-1-one.

14. The method according to claim 12, comprising the following steps:
mixing the α,β-unsaturated ketone, bis (pinacolato) diboron, the ligand, and the PNBI/CB-Cu/Au nanocatalyst at a molar ratio of 1:(1-1.2):0.003:(0.001-0.003) to obtain a mixture; wherein an amount of substance of the PNBI/CB-Cu/Au nanocatalyst is based on that of the copper nanoparticles immobilized on the polynorbornene/carbon black-crosslinked three-dimensional network carrier; and
adding a mixed solution of methanol and toluene at a volume ratio of 4:(1-4) to the mixture, and stirring at a room temperature for 8 h to 16 h to obtain an asymmetric boron addition product of the α,β-unsaturated ketone.

15. The method according to claim 14, further comprising the following step after the stirring at a room temperature is completed: subjecting an obtained product to filtration, rotary evaporation, and passing through a chromatographic column successively.

16. The method according to claim 11, wherein the PNBI/CB-Cu/Au nanocatalyst is applied to asymmetric boron addition of the chalcone for the first time, with a product yield of 96% and enantioselectivity of 93%.

17. The method according to claim 16, wherein the PNBI/CB-Cu/Au nanocatalyst is filtered, washed thoroughly thrice with water and ethanol, and dried for reuse.

* * * * *